W. D. PATTERSON, Jr.
AUTOMOBILE JACK.
APPLICATION FILED AUG. 28, 1914.

1,170,320.

Patented Feb. 1, 1916.

Witnesses
Fenton H. Belt
J. H. Sherwood

Inventor
W. D. Patterson Jr.,

# UNITED STATES PATENT OFFICE.

WILLIAM D. PATTERSON, JR., OF MARYSVILLE, KANSAS.

AUTOMOBILE-JACK.

1,170,320.

Specification of Letters Patent.

Patented Feb. 1, 1916.

Application filed August 28, 1914. Serial No. 859,110.

*To all whom it may concern:*

Be it known that I, WILLIAM D. PATTERSON, Jr., a citizen of the United States, residing at Marysville, in the county of Marshall and State of Kansas, have invented certain new and useful Improvements in Automobile-Jacks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in lifting jacks, designed especially for use upon automobiles and other vehicles and the object in view is to produce a simple and efficient device of this nature, consisting of a pneumatic piston with a plunger, the stem of which has a foot for engagement with the ground and affording means, when compressed air is applied to the cylinder, the latter, which is designed to be fastened to the vehicle, may cause the same to be elevated.

My invention comprises various details of construction, combinations and arrangements of parts which will be hereinafter fully described, shown in the accompanying drawings and then specifically defined in the appended claim.

Figure 1:
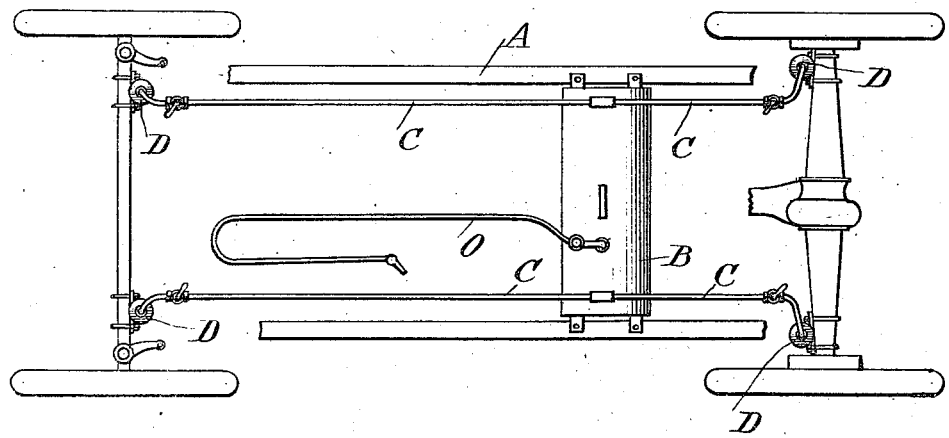
Figure 2:
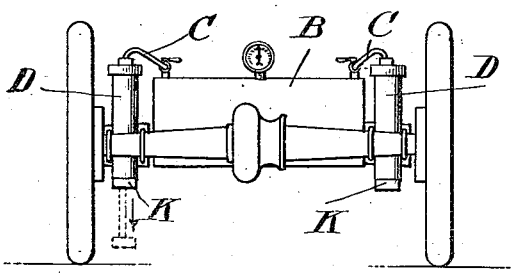
Figure 3:
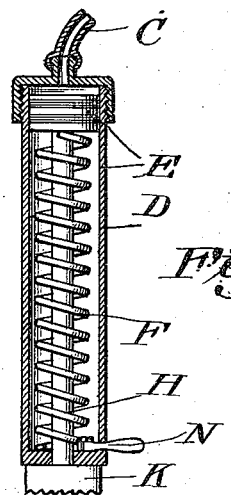

I illustrate my invention in the accompanying drawings, in which:

Figure 1 is a top plan view, showing the application of my invention. Fig. 2 is an end elevation, and Fig. 3 is an enlarged detail sectional view through the pneumatic cylinder.

Reference now being had to the details of the drawings by letter, A designates the frame of an automobile upon which is mounted a tank B adapted to contain air under pressure, and pipes C lead therefrom to the rear and forward axles where each communicates with an aperture in the upper end of the pneumatic cylinder D. A piston E is mounted within each cylinder and a spring F bears between the lower end and said piston and serves to return the piston to its normal position after the air has been released from the cylinder. A stem H is fixed to the piston and moves through an aperture in the bottom of the cylinder and has a foot K secured to its lower end, adapted to rest upon the ground or floor. When it is desired to hold the jack in an elevated position for any length of time, independent of the pneumatic means, I provide a pawl N which is pivotally mounted in the cylinder and which may be thrown into engagement with the stem of the piston to hold the automobile in an elevated position. When said pawl is not in use, it may be swung out of engagement with the piston rod to allow the latter to be acted upon by pneumtaic pressure.

In the drawings I have shown four jacks, secured two to the forward and two to the rear axle. Pipes O project from the tank and are adapted to have valve-regulated exit openings for the purpose of inflating the tires from the supply of air within the tank.

In operation, the air is allowed to pass to the jacks by opening the valves in the pipes and allowing the compressed air to cause the cylinder to move against the tension of the spring, thereby elevating the vehicle from the ground. When the air is released from the cylinder, the spring will tend to normally return the pistons to their starting position.

What I claim to be new is:

A lifting jack for automobiles comprising, in combination with a cylinder adapted to be attached to a vehicle frame, a piston mounted within the cylinder, a stem secured to the under surface of the piston and extending through an aperture in the bottom thereof, a foot upon the lower end of the piston stem, a cap fitted over the upper end of the cylinder and having an inlet pipe communicating with an aperture therein, a pawl passing through the lower portion of the cylinder and adapted to engage said stem, a spring upon the stem and interposed between said piston and pawl.

In testimony whereof I hereunto affix my signature in presence of two witnesses.

WILLIAM D. PATTERSON, JR.

Witnesses:
WILLIAM D. PATTERSON,
A. L. TAINTER.